United States Patent [19]

Kirkpatrick

[11] 4,198,224
[45] Apr. 15, 1980

[54] PROCESS FOR MAKING A CELLULATED VITREOUS MATERIAL

[75] Inventor: John D. Kirkpatrick, Trafford, Pa.

[73] Assignee: Pittsburgh Corning Corporation, Pittsburgh, Pa.

[21] Appl. No.: 934,186

[22] Filed: Aug. 16, 1978

[51] Int. Cl.$^2$ .............................................. C03B 19/08
[52] U.S. Cl. .......................................... 65/22; 65/134; 106/40 V
[58] Field of Search ............................ 65/18, 22, 134; 106/40 V

[56] References Cited

U.S. PATENT DOCUMENTS

| | | | |
|---|---|---|---|
| 3,207,588 | 9/1965 | Slayter et al. | 65/22 X |
| 3,441,396 | 4/1969 | D'Eustachio et al. | 65/22 |
| 3,623,897 | 11/1971 | Wojcik | 106/40 V X |
| 3,995,956 | 5/1976 | Terner | 65/134 |

FOREIGN PATENT DOCUMENTS

| | | | |
|---|---|---|---|
| 622218 | 3/1946 | United Kingdom | 65/22 |
| 1026992 | 4/1966 | United Kingdom | 65/22 |

*Primary Examiner*—Robert L. Lindsay, Jr.
*Attorney, Agent, or Firm*—Stanley J. Price, Jr.; John M. Adams

[57] ABSTRACT

Where a formulated glass cullet is utilized as a portion of the pulverulent batch material, the cellular material is prepared by first grinding the glass cullet in a ball mill with a cellulating agent such as carbon black until the pulverulent material attains an average particle size of about 4 or 5 microns. The pulverulent batch containing the glass cullet and cellulating agent is then sintered at a sintering temperature for a sufficient period of time to permit the glass cullet material to soften and coalesce and increase in density without, however, cellulating the glass batch. The sintering process is then interrupted and the sintered material may be cooled and crushed to a size that passes through a United States 10 mesh screen. The crushed and screened sintered material is then positioned in a suitable mold and subjected to a cellulating temperature of between about 1600° F. (870° C.) and 1650° F. (899° C.) for a sufficient period of time for the cellulating agent to react and cellulate the sintered batch and form a cellulated material. The resultant cellulated material is then quenched to terminate the cellulating process, removed from the mold and thereafter annealed. With the above process, it is possible to immediately subject the sintered material to the elevated cellulating temperature rather than slowly advancing the temperature from slightly above the sintering temperature to the cellulating temperature. In this manner the time required to cellulate the sintered batch is reduced substantially. The above process may also be utilized with a pulverulent batch comprising a combination of minerals and commercial chemicals that have not been melted to form a glassy type material, such as the glass cullet above described. By first sintering the pulverulent batch and thereafter heating sized sintered particles to a cellulating temperature, flaws such as folds and uneven densities frequently found in cellulated material are eliminated.

15 Claims, No Drawings

4,198,224

PROCESS FOR MAKING A CELLULATED VITREOUS MATERIAL

BACKGROUND OF THE INVENTION

1. Field of the Invention

This invention relates to a process for making cellular material and more particularly to a process for first sintering a mixture of pulverulent batch and cellulating agent for a preselected period of time, terminating the sintering of the material and thereafter heating the sintered material to a cellulating temperature to form a cellular material.

2. Description of the Prior Art

U.S. Pat. No. 2,736,142 to Baumler et al describes a process for manufacturing cellulated material and eliminating the flaws that are found in the blocks of cellulated material caused by uneven heating and the like. In this process the pulverulent glass batch is positioned in a mold and thereafter a dicing device is inserted into the layer of pulverulent batch to form generally rectangular cubes of the pulverulent batch. Thereafter, the dicing device is removed and the diced pulverulent batch in the mold is subjected to a heating schedule which includes heating the pulverulent batch at a sintering temperature for a sufficient period of time for the pulverulent batch to soften and coalesce. The temperature is then slowly increased to the cellulating temperature where the pulverulent batch reacts with the cellulating agent to cellulate the material. It is stated in U.S. Pat. No. 2,736,142 that the diced arrangement of the pulverulent batch eliminates the imperfections, i.e., folds and uneven densities in the cellular material. In Baumler, however, a conventional heating schedule is utilized and requires the material to remain in the cellulating furnace for a substantial period of time.

U.S. Pat. No. 2,775,524 is directed to a method for producing cellulated articles by coating the carbonaceous cellulating agent on an inert substance having a high surface area and heating the coated article in the presence of air to about 570° F. (300° C.) to form a black char. This black char is mixed with conventional glass cullet and the admixture is cellulated in a conventional manner.

U.S. Pat. No. 3,532,480 is directed to a method of making cellular glass by first agglomerating the discrete powdery mixture of pulverulent glass and cellulating agent into pellets and heating the pellets to an elevated temperature so that the pellets partially cellulate and cohere to each other to form a sheet of coalesced partially expanded pellets. The sheet of coalesced partially expanded pellets in a plastic state is fed into a heating chamber where the sheet of coalesced partially expanded pellets further cellulate to form a sheet of cellular glass.

U.S. Pat. No. 4,075,025 discloses a process of forming a potassium aluminoborosilicate frit by preparing an aqueous slurry of colloidal silica, caustic potash, boric acid and alumina. The slurry is dried and the aggregates are thereafter crushed, calcined and rapidly quenched. The calcined mixture of the above constituents is introduced into a crusher such as a ball mill and the carbonaceous cellulating agent is also introduced into the crusher to form a homogeneous admixture of the calcined mixture and the cellulating agent. The admixture, as a fine pulverulent material is then cellulated in a conventional manner to form cellular borosilicate bodies. In the above process, only the pulverulent constituents are calcined and thereafter the calcined material is admixed with the carbonaceous cellulating agent.

SUMMARY OF THE INVENTION

This invention is directed to a process for making a cellulated vitreous material from a pulverulent batch which includes a mixture of pulverulent vitreous material and a pulverulent cellulating agent. The process includes heating the pulverulent batch to a sintering temperature for a sufficient period of time to permit the pulverulent vitreous material to soften and coalesce without cellulating the mixture to form a sintered batch. The heating of the sintered batch is interrupted and thereafter the sintered batch is heated to a cellulating temperature for a sufficient period of time for the cellulating agent to react and cellulate the sintered batch and form a cellulated vitreous material. The cellulated material has a density of between about 9 pcf (0.14 g/cc) and 30 pcf (0.480 g/cc).

The pulverulent vitreous material may be practically any form of formulated glass susceptable of being sintered when in a pulverulent state and cellulated with a suitable cellulating agent to form cellular bodies. Conventional soda lime silica glass is the most common form utilized. Other components may, of course, be added in appropriate amounts to form various conventional glasses that may be available as glass cullet. It should be understood, however, that the process is also applicable to the cellulation of other vitreous materials, such as slags, natural mineral silicates, volcanic ash and formulations as described in U.S. Pat. No. 3,793,039 entitled "Foamed Glass Body" and formulations described in U.S. Pat. No. 4,075,025. The process is also suitable for use in cellulating pulverulent batches of vitreous material and cellulating agents to which have been added small amounts of metal, metal oxides and sulfates and other materials to aid in cellulation.

The pulverulent batch which contains the pulverulent vitreous material and cellulating agent may be sintered in any suitable manner, such as sintering in a conventional mold pan or as preagglomerated pellets on a sintering grate or in a rotary kiln. The sintering should take place in an oxygen deficient atmosphere to prevent oxidation of the carbonaceous cellulating agent. It is preferred that the sintered batch have a size consist suitable to pass through a United States Sieve screen having between 8 and 12 mesh with a 10 mesh screen preferred with formulated glass. When the batch is subjected to conventional sintering processes, it is preferred that the batch be cooled and crushed to obtain the above desired size consist. However, the glass batch may be formed into pellets having the desired size and the pellets are thereafter sintered to obtain sintered pellets having the above preferred size consist without comminuting the pellets. The advantages of subjecting the admixture of pulverulent vitreous material and cellulating agent to separate sintering and cellulating steps results in the elimination of the flaws frequently found in the material cellulated in a conventional manner. It is believed that the flaws such as folds in the material are initiated during the sintering phase of the cellulation process and result from the uneven heating of the batch during sintering. Only a skilled observer can detect phenomena in the sinter which will result in defects in the cellulated material.

With the above process it is possible to reduce substantially the amount of time that the material remains in the cellulating furnace. Because of the pulverulent condition of the glass batch, substantial difficulty is encountered in transferring heat into the pulverulent material. Therefore, sintering the pulverulent material takes a substantial amount of time and is a relatively slow process. Reducing the sintering time or sintering in a furnace other than an expensive cellulating furnace or sintering in a rotary kiln reduces substantially the cost of making the cellular material. The substantial period of time required to sinter the pulverulent material in the conventional cellulating furnace controls both the length of the furnace and the productivity of the cellular material in the furnace. By eliminating sintering in the cellulating furnace, productivity can be increased and the length of the furnace reduced.

Where a high density cellular material is desired in the conventional cellulation process, there is a limitation on the amount of batch as powder that can be loaded into a conventional mold. In addition, there is a heat transfer problem in the pulverulent batch. Where a sized sintered material is utilized rather than the pulverulent batch, more batch can be loaded into the mold and the sintered batch can be more rapidly raised to the cellulating temperatures because of its granular nature and higher bulk density.

The sintered product can be prepared at one location and transported to a second location where cellulation can be performed. The same is not practical with a pulverulent batch material since the constituents are hygroscopic and also tend to segregate under vibration. As above discussed, a batch as preagglomerated pellets can be sintered in a rotary kiln or sinter grate thus permitting low cost firing. During sintering in a rotary kiln, the material is not subjected to a high enough temperature for the material to adhere to the walls of the kiln and therefore does not require a parting agent on the walls of the kiln.

Accordingly, the principal object of this invention is to substantially reduce the time required to cellulate vitreous material in a cellulating furnace.

Another object of this invention is to eliminate irregularities such as folds and the like in the cellulated material.

Another object of this invention is to provide a process for obtaining cellular material having higher densities by more heavily loading the molds.

These and other objects of the present invention will be more completely described and disclosed in the following specification and the appended claims.

DESCRIPTION OF THE PREFERRED EMBODIMENTS

The process for making the cellulated material where a formulated glass is employed as one of the constituents includes obtaining glass cullet of a preselected composition, such as glass cullet of conventional soda lime glass and introducing the glass cullet into a ball mill. A cellulating agent, such as carbon black is introduced into the ball mill thus admixed with the glass cullet and co-comminuted to obtain an average particle size of between 3 and 10 microns. The bulk density of the pulverulent batch is between about 50 to 60 pcf (0.80 to 0.96 g/cc). The comminuted batch mixture is then sintered in any suitable manner as for example in a mold pan or as preagglomerated pellets in a rotary kiln under oxygen deficient conditions. In sintering, the pulverulent batch is subjected to a sintering temperature of between about 1200° F. and 1400° F. (650° C. and 760° C.) and maintained at that temperature for a sufficient period of time for the vitreous material in the glass batch to become soft and coalesce. However, the material during sintering does not cellulate and the carbonaceous cellulating agent does not react with the other materials in the glass batch to cellulate the material. The sinter itself has a true density of about 140 $\#/ft^3$ (2.24 g/cc). The sintered material is then cooled and comminuted. The comminuted material is screened so that it has a size capable of passing through a minus 10 mesh U.S. Standard screen and exhibits a bulk density of about 80 to 100 pcf (1.28 to 1.6 g/cc). Where pellets of the batch are sintered, the comminution and sizing of the sintered material is not necessary since the pellets can be formed of a preselected size so that after sintering, the pellets will reduce in volume and have a size capable of passing through a minus 10 mesh screen. Because of the increase in bulk density, the volume of the material in a mold pan decreases substantially.

The sintered sized material which contains the unreacted cellulating agent is placed in a mold pan and the mold pan is introduced into a cellulating furnace where the sintered material is subjected to cellulating temperatures and maintained at these cellulating temperatures until the desired cellular material is attained. The cellular material in the form of blocks is then cooled and quenched to stop the cellulating process and the blocks are then removed from the mold. Thereafter, the cellular blocks are annealed to slowly cool the cellular blocks through the thermal range between the annealing and strain point of the vitreous material and thereafter cooled to ambient temperature. The cellular material is trimmed to form generally rectangular blocks of cellular material useful as insulation.

The heating schedule for the sintered material is more versatile than the heating schedule for the conventional cellulating process in which the pulverulent batch materials are continuously heated while the material first sinters and then cellulates. In the conventional cellulation process, the pulverulent batch is slowly heated to the sintering temperature because of its pulverulent nature and the difficulty of transferring heat into a fine powder. After the pulverulent material has softened and coalesced, the temperature is slowly increased from the sintering temperature to the cellulating temperature and then maintained at this cellulating temperature for a sufficient period of time to cellulate the material.

With the described process, the pulverulent batch material may be sintered in separate facilities and after being properly sized and positioned in a mold pan, the mold pan can be introduced into a cellulating furnace which is at the cellulating temperature without employing the prolonged slowly increasing heating schedule. With this versatility, it is now possible to substantially reduce the time required to maintain the material in the furnace. It is also possible to vary the peak cellulating temperature to thus control the density of the resulting cellulating material.

EXAMPLE 1

A batch was prepared from a glass cullet having the following composition in percent by weight:
$SiO_2$: 72.7
$Na_2O$: 12.0
CaO: 5.2
MgO: 3.8
$K_2O$: 0.7
$Al_2O_3$: 4.5

$Fe_2O_3$: 0.2
$SO_3$: 0.3.

Said cullet was admixed with 0.2% carbon black and co-comminuted in a ball mill to an average particle size of between 4 and 5 microns to form a pulverulent glass batch. The glass batch was placed into a sintering pan and introduced into a sintering furnace. The furnace was at 1400° F. (760° C.) and had an oxygen deficient atmosphere to prevent the oxidation of the carbonaceous cellulating agent. The batch remained in the furnace for a period of about 30 minutes during which period the batch formed a sinter product. The sinter product was removed from the furnace and cooled. The sinter was then comminuted and screened on a U.S. 10 mesh standard screen. The sintered material passing through the screen had a size consist less than 10 mesh and was placed in a stainless steel mold pan and introduced into a cellulating furnace having an initial temperature of 1490° F. (810° C.). The temperature was slowly increased so that a temperature of 1600° F. (870° C.) was attained in 15 minutes. The temperature was held at 1500° F. (816° C.) for 30 minutes during which the pulverulent sintered product cellulated and formed a cellular material. The cellular material was quenched and annealed and exhibited properties comparable to a cellular material cellulated under a conventional cellulating process. The density of the cellular material was 10.4 pcf (0.17 g/cc).

EXAMPLE 2

The same glass cullet was prepared and sintered as described in Example 1. The cellulating temperature was 1650° F. (899° C.) and the cellular material had a density of 9.45 pcf (0.15 g/cc). Thus, by increasing the peak temperature, the density of the cellular material is reduced.

EXAMPLE 3

The same process as described in Example 1 with the same batch was sintered as above described and the sintered material in the stainless steel mold was introduced into a cellulating furnace having a temperature of 1640° F. (893° C.) and was held at this temperature for 35 minutes. The cellular material had a density of 10 pcf (0.16 g/cc).

Thus, with the herein described process, it is possible to introduce the sintered material into a furnace at or above the cellulating temperature and obtain a cellular material that has desirable physical properties and is free of folds and other types of flaws. Thus, in Examples 1, 2 and 3, the cellular material was flaw-free and was cellulated utilizing heating schedules that could not be used in the conventional cellulating process. If the rapid heating schedule above discussed in Examples 1, 2 and 3 were used on a raw batch, the product would be full of folds and other inhomogeneities.

EXAMPLE 4

A composition described in U.S. Pat. No. 3,793,039 which included as constituents calcined volcanic ash, sodium borate, sodium bicarbonate, calcium fluoride, sodium acetate, antimony oxide and carbon black were milled in a ball mill until the average particle size of 2 to 4 microns was attained. The bulk density of this batch was 32 pcf (0.51 g/cc). The batch of pulverulent material was placed in a stainless steel mold and the mold was introduced into a furnace. The entry temperature of the furnace was 1400° F. (760° C.) and the furnace cooled to 1250° F. (677° C.) due to the cold load and then increased to 1450° F. (788° C.) in 20 minutes. The pulverulent material in the mold was maintained in the furnace at 1450° F. (760° C.) for a period of about 40 minutes. The mold was removed from the furnace and cooled. The cooled sintered product was then comminuted and screened through a U.S. 12 mesh screen. The material passing through the screen had a bulk density of about 62 pcf (0.99 g/cc) and a true density of about 100 pcf (1.60 g/cc).

The sintered material was positioned in a stainless steel mold and introduced into a cellulating furnace. The furnace had an initial temperature of 1540° F. (838° C.) and was increased to 1650° F. (899° C.) in a period of 30 minutes. The material remained in the furnace for an additional 50 minutes at a temperature of 1650° F. (899° C.). The temperature of the furnace was then reduced to 1350° F. (732° C.) and held for 15 minutes to permit the interior of the block to reach equilibrium. At this time the furnace was increased to 1400° F. (760° C.) to expand the mold from the cellulated material. The mold was then removed and the cellular block was placed in an annealing oven where it was annealed in 13 hours of progressive cooling. The block of cellular material exhibits a uniform cell size of about 0.4 to 0.7 millimeters, an average density 18 pcf (0.29 g/cc) with the density ranging from 17 pcf (0.27 g/cc) in the periphery to 19 pcf (0.30 g/cc) in the core. The block of cellular material was carefully sectioned and exhibited no flaws or defects. Flaws such as folds, large holes, cold or hot checks were not present in the block of cellular material. Utilizing the conventional cellulating process with the above batch materials yields a block having lower densities and/or large central flaws in the block.

EXAMPLE 5

A batch was prepared and sintered as described in Example 4 and introduced into a cellulating furnace where the temperature during cellulation was raised to 1660° F. (904° C.). The resultant density of the cellulated material was 16.6 pcf (0.27 g/cc).

EXAMPLE 6

The same batch of pulverulent materials and the cellulating temperature was increased to 1720° F. (936° C.). The cellular material had a density of 11.5 pcf (0.18 g/cc).

It will be apparent from Examples 4, 5 and 6 that it is possible with the herein described process to control the density of the cellular material by increasing or decreasing the cellulating temperature and yet obtain flaw-free cellular material. With the conventional cellulating process, it is difficult to attain such results and obtain a cellular material free of flaws. It is found extremely difficult to attain flaw-free higher density cellulated material, i.e., greater than 16 pcf (0.26 g/cc) utilizing the conventional cellulation process.

With the herein described process, it is now possible to prepare flaw-free cellular material at selected densities and reduce substantially the furnace time for sintering and cellulation.

Throughout the specification and claims, the term vitreous is intended to designate any glassy material either natural or formulated and any combination of chemical ingredients which, when subjected to elevated temperature, soften and coalesce to form a glass-like material.

With the above process, it is also possible to admix a minor portion of the pulverulent batch with the sintered batch and subject the admixture to cellulating temperatures to obtain a cellulated material having the desired physical and chemical properties without forming flaws therein.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A method of making a cellulated material comprising,
   admixing a pulverulent vitreous material and a cellulating agent to form a pulverulent batch,
   heating said pulverulent batch to a sintering temperature and maintaining said pulverulent batch at said sintering temperature for a sufficient period of time to permit said pulverulent vitreous material to soften and coalesce to form a sintered batch,
   terminating the heating of said sintered batch before the cellulating agent reacts with the vitreous material so that cellulation of the sintered batch does not occur,
   permitting said sintered batch to cool below said sintering temperature, and
   thereafter heating said sintered batch to a cellulating temperature and maintaining said sintered batch at said cellulating temperature for a sufficient period of time for the cellulating agent to react and cellulate the sintered batch to form a cellulated material.

2. A method of making a cellulated material as set forth in claim 1 in which said vitreous material comprises pulverulent formulated glass.

3. A method of making a cellulated material as set forth in claim 1 in which said vitreous material includes pulverulent glass-making constituents.

4. A method of making a cellulated material as set forth in claim 2 which includes,
   heating said pulverulent batch to a sintering temperature of about 1400° F. (760° C.) and heating said sintered batch to a cellulating temperature of between about 1600° F. (871° C.) and 1650° F. (899° C.).

5. A method of making a cellulated material as set forth in claim 1 which includes,
   introducing said cooled sintered batch into a cellulating furnace maintained at the cellulating temperature.

6. A method of making a cellulated material as set forth in claim 1 in which said vitreous material comprises pulverulent formulated glass, and
   introducing said cooled sintered batch into a cellulating furnace maintained at a temperature of between about 1600° F. (871° C.) and 1650° F. (899° C.).

7. A method of making a cellulated material as set forth in claim 1 which includes,
   controlling the average density of the cellulated material by increasing or decreasing the cellulating temperature.

8. A method of making a cellulated material as set forth in claim 1 in which said pulverulent batch has a bulk density of between about 32 pcf (0.51 g/cc) and 60 pcf (0.96 g/cc) and said sintered material has a true density of between 100 pcf (1.6 g/cc) to 140 pcf (2.24 g/cc) and at a size of less than 10 mesh has a bulk density of between about 62 pcf (0.99 g/cc) and about 100 pcf (1.60 g/cc).

9. A method of making a cellulated material as set forth in claim 1 which includes comminuting said sintered batch to a size consist that will pass through an 8 to 12 mesh screen.

10. A method of making a cellulated material as set forth in claim 1 which includes,
    admixing a minor portion of said pulverulent batch with said sintered batch to form a mixture, and
    thereafter heating said mixture to a cellulating temperature to form a cellulated material.

11. A method of making a cellulated material as set forth in claim 10 which includes,
    admixing up to 20% by weight of pulverulent batch with about 80% by weight of sintered batch.

12. A method of making a cellulated material as set forth in claim 3 which includes,
    milling and comminuting said pulverulent glass making constituents to an average particle size of between 2 and 4 microns,
    heating said pulverulent batch to a sintering temperature of about 1450° F. (788° C.), and
    heating said sintered batch to a cellulating temperature of between about 1650° F. (899° C.) and 1720° F. (938° C.).

13. A method of making a cellulated material as set forth in claim 3 which includes,
    controlling the average density of the cellulated material to between about 9 pcf (0.144 g/cc) and 30 pcf (0.48 g/cc) by increasing or decreasing the cellulating temperature.

14. A method of making a cellulated material as set forth in claim 1 which includes,
    forming discrete pellets of said pulverulent batch,
    heating said discrete uncoated pellets of said pulverulent batch to a sintering temperature and maintaining said pellets at said sintering temperature for a sufficient period of time to permit said discrete pellets to soften and coalesce without cellulating said batch to form a sintered discrete pellet product, and
    terminating the heating of said discrete sintered pellet product and thereafter heating said sintered discrete pellet product to a cellulating temperature and maintaining said sintered discrete pellet product at said cellulating temperature for a sufficient period of time for the cellulating agent to react and cellulate the discrete sintered pellet product to form a unitary block of cellulated material.

15. A method of making a cellulated material as set forth in claim 14 which includes,
    heating said discrete uncoated pellets in a rotary kiln under oxygen deficient conditions to a sintering temperature and maintain said discrete uncoated pellets within said rotary kiln for a sufficient period of time to permit said discrete pellets to soften and coalesce without cellulating said batch to form a sintered batch of discrete sintered uncoated pellets.

* * * * *